Nov. 12, 1935.                G. O. LEHMANN                2,020,364
                                VAPORIZER
                           Filed Aug. 24, 1933

Inventor:
Gustav Oscar Lehmann
By  Jno. Broadale
          Attorney.

Patented Nov. 12, 1935

2,020,364

UNITED STATES PATENT OFFICE 2,020,364

VAPORIZER

Gustav Oscar Lehmann, Berlin, Germany

Application August 24, 1933, Serial No. 686,586

1 Claim. (Cl. 219—43)

My invention relates to improvements in vaporizers.

The object is to provide improved means for heating a body of liquid to be vaporized, and which shall become ineffective upon a predetermined reduction of said body of liquid.

The object is especially to provide a device of the greatest possible simplicity and efficiency and in which the operating parts shall be protected from injury.

The invention also comprises simple and efficient means for adjusting the device to receptacles or containers differing in weight, or to provide a varying minimum in weight of content, which shall render the heating device ineffective.

Referring to the drawing which illustrates merely by way of example, a preferred embodiment of my invention:—

Similar numerals refer to similar parts throughout the several views.

Figure 1:
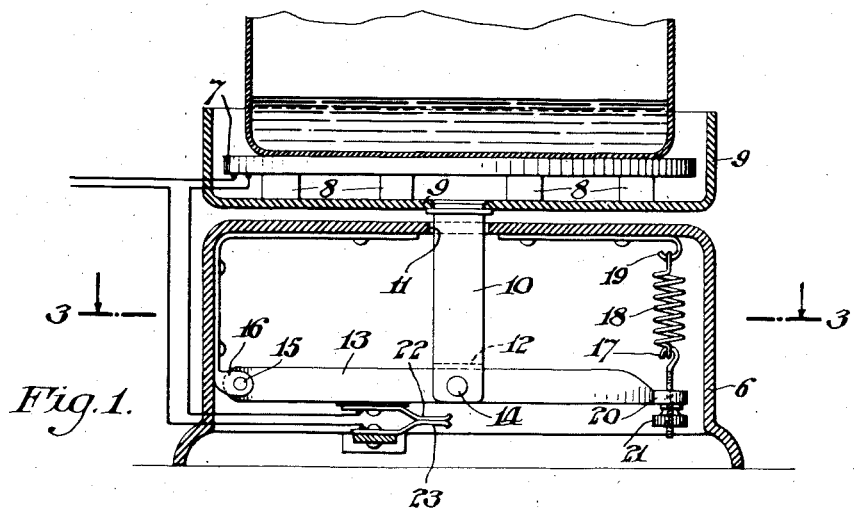
Fig. 1 is a vertical section.
Figure 2:
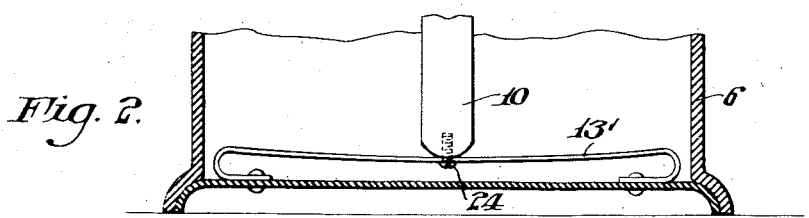
Fig. 2 is a fragmentary section of a modification.

The housing 6 provides the support or stand for the heating plate 7, which, in the present example, is of usual or conventional type of electric heating plate. This plate 7 is secured to and supported by a number of insulating blocks 8 secured to the bottom of the pan shaped element 9. The pan element 9 is secured to and supported upon the post 10, extending downwardly from the center of the pan. This post passes through and is vertically movable in the opening 11 in the top wall of the housing 6. The lower end of post 10 is provided with a channel or slot 12 for receiving the lever 13, the lever being secured in said slot by the pivot 14 The lever 13 preferably extends diametrically across the housing and is pivoted at one end, as at 15, to a fixed abutment 16, and at the other end is provided an adjustable hook 17 connected to one end of spring 18; the other end of said spring is connected to the hook 19 secured to the wall of housing. The hook 17 passes through the lug 20 on the end of lever 13 and is provided with the thumb nut 21 for adjusting the tension of the spring as required, as and for the purpose to be explained.

Preferably within the housing 6, located at any convenient place, is provided an electric switch or the like operating synchronously with the movement of the heating plate, for making and breaking the electric circuit of said heating plate 7.

I have shown by way of example, in Fig. 1, a contact 22 secured to the lever 13, but insulated therefrom, so that said contact will be movable with said lever, A cooperating contact 23 is secured in any suitable way to the housing 6, and is therefore fixed. These contacts are adapted to open and close the said electric circuit.

Figure 3:
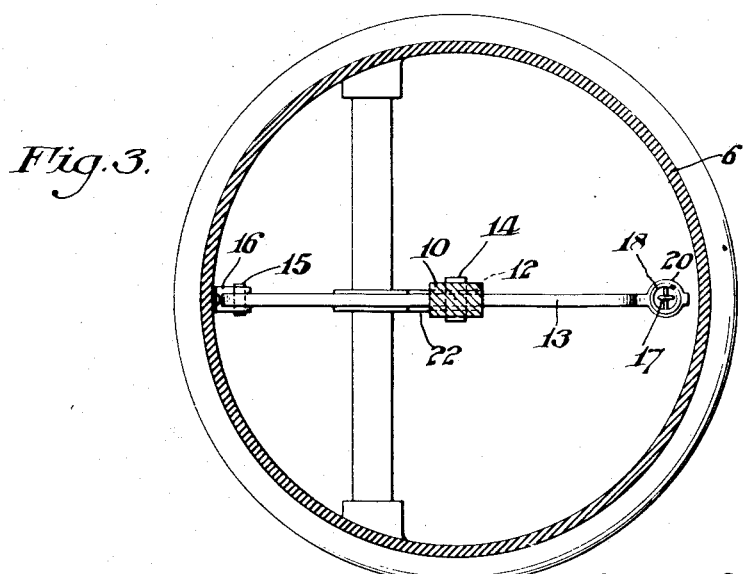
Fig. 3 is a horizontal section on line 3, 3 of Fig. 1.

In the modification shown in Fig. 3, instead of the spring controlled lever 13, a simple spring element 13' is shown, with the post 10 secured, in any suitable way, as by a screw 24, to the middle of said spring element. The advantage of this arrangement is that the spring action on the post is more evenly delivered.

When the container C, for the liquid to be heated or vaporized, is placed upon the heating plate 7 the surrounding wall or flange of pan 9 insures that the container is placed properly upon said plate. The weight of the container and its contents will normally depress the post 10 and lever 13 against the tension of spring 18, so as to bring the contacts 22 and 23 into contact with each other, and thus close the circuit of the heating plate. This causes the heating and eventually the vaporization of the liquid in the container.

As this device is especially adapted for a vaporization in connection with volatile medicaments, it becomes desirable that the vaporization shall continue for a considerable period of time without attention. This requires that the heat communicated to the container and to liquid content, shall be interrupted before the content has been entirely exhausted, otherwise the container becomes damaged.

In accordance with the present invention the tension of spring 18 is such, as to react on the lever 13 to lift the same to separate the contacts 22 and 23, when the weight of container and its content reached a predetermined minimum. This combined minimum weight can be experimentally determined by the adjustment of the spring element when the liquid in the container is just, or slightly more than, sufficient to protect the container from overheating. When this adjustment is once ascertained and secured, with the container adapted to be used with the device, then the device is ready for continuous or intermittent use. The container is filled with the liquid, and the vaporization proceeds until said predetermined minimum is reached, whereupon the circuit is interrupted until the container is again filled; and so the operation may be repeated as desired. No attention is required to protect the device, since the heat is automatically "shut off" whenever the predetermined minimum of liquid is reached.

What I claim is:—

In a vaporizer, the combination of a housing, an electric heating element, means providing an electric circuit therefor, said heating element adapted to support a container, a supporting post connected to the heating element and having a guide-way in the housing, a post supporting lever pivoted at one end to the housing and spring connected between to the housing and its other end, said lever connected at a point between its two ends to the post, means for adjusting the tension of the spring, a pair of electric contacts in the said circuit, one movable with the lever, said contacts having contacting faces in parallel planes substantially at right angles with the lines of said contact movement.

GUSTAV OSCAR LEHMANN.